J. V. PUGH & W. BLAIR.
VEHICLE WHEEL.
APPLICATION FILED JAN. 5, 1915.

1,234,387.

Patented July 24, 1917.
4 SHEETS—SHEET 3.

Attest:
Ewd R. Tolson
C M Hamilton

Inventor:
John V. Pugh,
William Blair,
by Spear, Middleton, Donaldson & Spear
Attys.

UNITED STATES PATENT OFFICE.

JOHN V. PUGH AND WILLIAM BLAIR, OF COVENTRY, ENGLAND, ASSIGNORS TO RUDGE-WHITWORTH LIMITED, OF COVENTRY, ENGLAND.

VEHICLE-WHEEL.

1,234,387.    Specification of Letters Patent.    Patented July 24, 1917.

Application filed January 5, 1915. Serial No. 710.

*To all whom it may concern:*

Be it known that we, JOHN VERNON PUGH, a subject of the King of Great Britain and Ireland, and residing at Guiting House, Allesley, Coventry, in the county of Warwick, England, and WILLIAM BLAIR, a subject of the King of Great Britain and Ireland, and residing at 152 Albany road, Coventry, in the county of Warwick, England, have invented certain new and useful Improvements in and Relating to Vehicle-Wheels, of which the following is a specification.

This invention relates to vehicle wheels provided with spokes, and to means for reducing the air resistance of such wheels when revolving.

It has already been proposed for the purpose of reducing air resistance and protecting the spokes against dirt and wet to attach disks or covers upon each side of the wheel so as to completely inclose the spokes. Such covers if permanently fixed to both sides of the wheel have necessarily to be provided with gaps or openings in order to obtain access to the valve for inflating the tire, or to the security bolts. It is also difficult to apply levers or other tools for the removal or replacement of tires or detachable flanges when both disks are permanently attached to the wheel.

Disks and covers provided with numerous openings are also open to the objection that dirt and wet are easily admitted to the spokes unless the means for covering the openings are exceedingly well fitted.

The object of the present invention is to overcome the foregoing disadvantages and to provide a cheap and simple means for covering in the spokes of a wheel.

The invention consists in improved covering means for providing substantially continuous surfaces of revolution upon each side of a wheel, said means comprising disks which cover the spokes and are so formed and attached that they are pressed around their circumferences firmly against the sides of the rim, and the outer disk is readily removable without affecting the fastening of the inner disk.

The invention also consists in spoke-covering disks of the foregoing type, in which the disk upon the inner side of the wheel is attached by a plurality of screw-threaded devices arranged around the disk while the disk upon the outer side is provided with a fastening device at or about the center of the wheel.

The invention further consists in spoke-covering disks of the type last mentioned, in which the disk upon the outer side of the wheel is fastened by a threaded device which retains the outer and inner parts of the wheel hub in connection, said threaded device being rotatably attached to said disk.

The invention also consists in improved means for providing substantially continuous surfaces of revolution upon each side of a wheel by the attachment of disks covering the spokes, as hereinafter described.

Referring now to the accompanying drawings, which illustrate by way of example some constructions for carrying the invention into effect, Figure 1 is a cross sectional view of a wheel provided with covering disks in accordance with one form of the invention.

Figure 1:
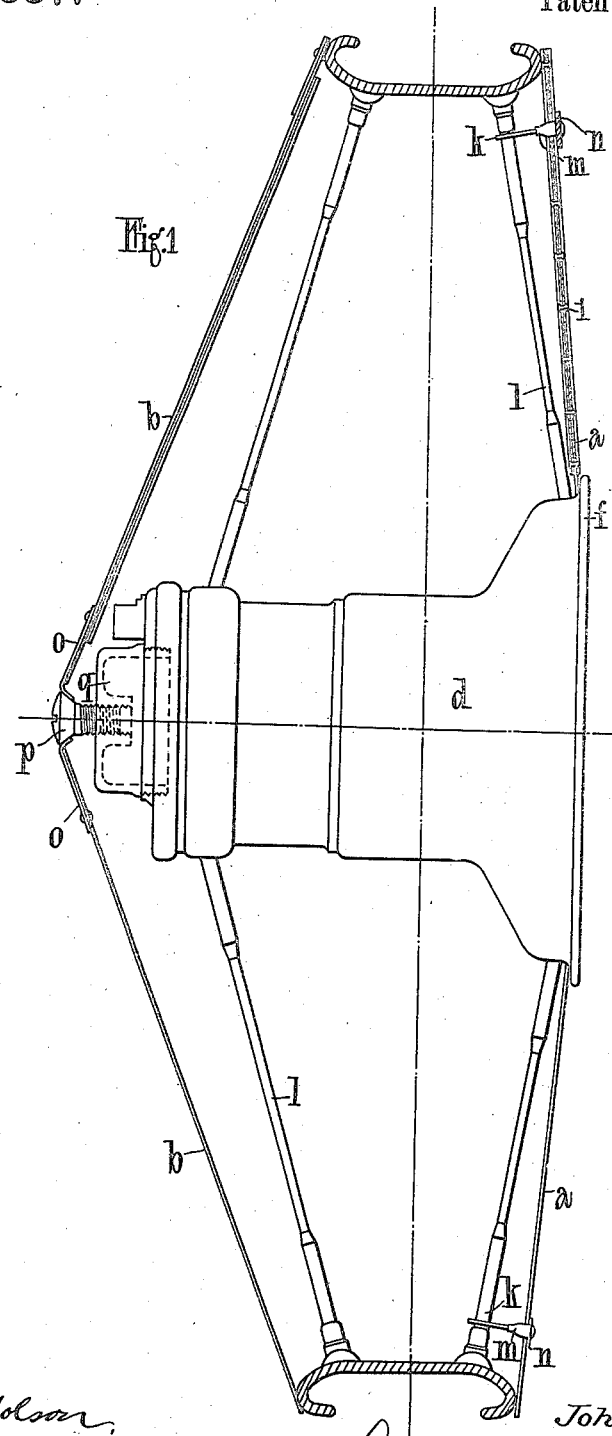
Figure 2:
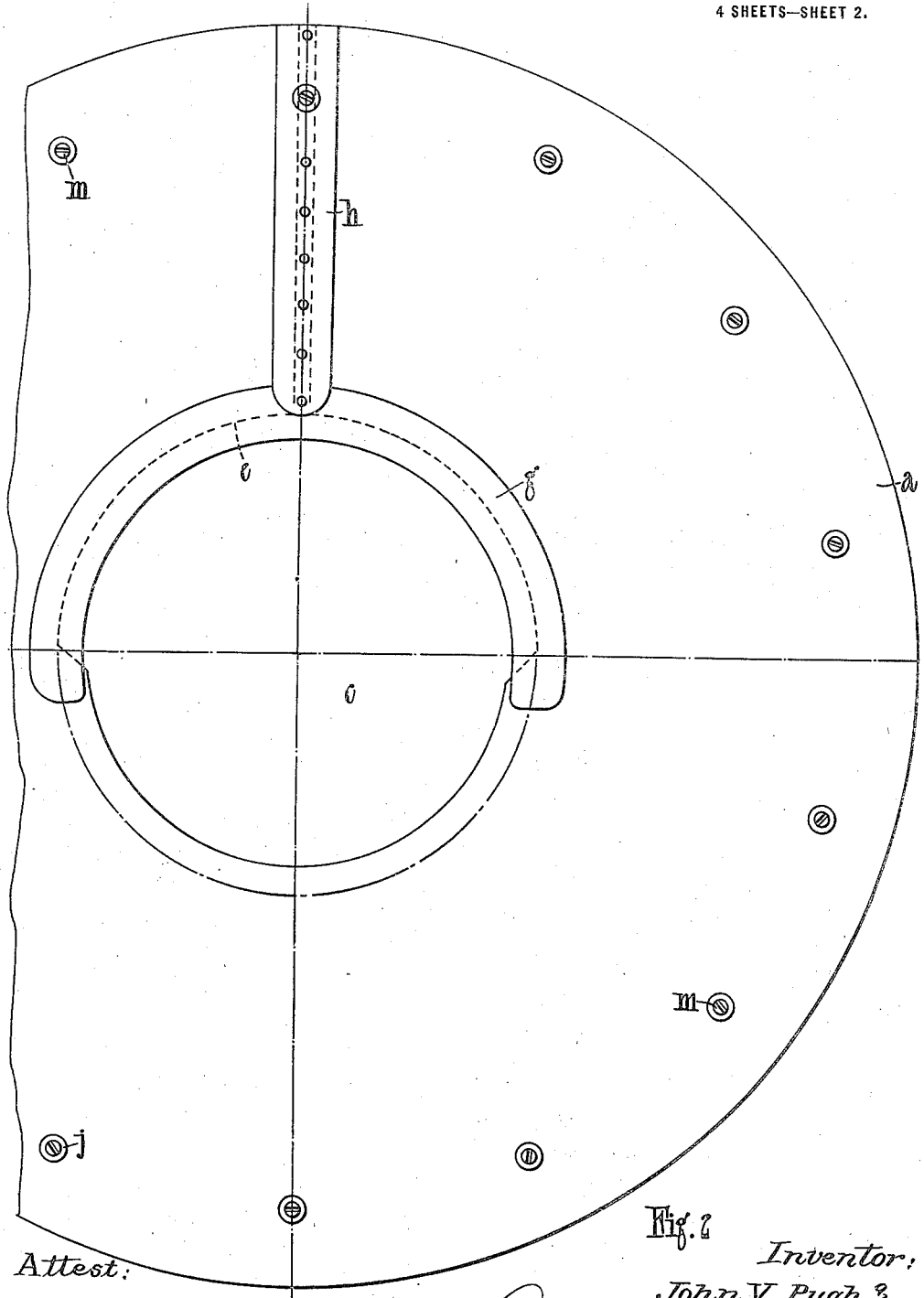
Fig. 2 is an elevation of the inner disk shown in Fig. 1.

In carrying this invention into effect as shown by way of example in Figs. 1 and 2, $a$ and $b$ represent respectively inner and outer covering disks attached to an ordinary type of wire spoked wheel. The disks $a$ and $b$ may be constructed of any suitable material such as thin sheet steel, brass, aluminium or other metal, or wood of any type; celluloid or other like materials may be employed; the material may be corrugated if desired.

The disk $a$ for the inner side of the wheel is provided with a central aperture $c$ for accommodating the inner end of the wheel hub $d$, this aperture being of a larger diameter in the upper half, as shown at $e$ in Fig. 2, so that the disk may be passed over the outturned flange $f$ of the hub $d$ of the wheel. When the disk is in position upon the hub the semi-circumferential space between the hub and the enlarged part of the aperture is closed by a U-shaped piece $g$ which is provided with an extended portion or tail-piece $h$.

Figure 5:
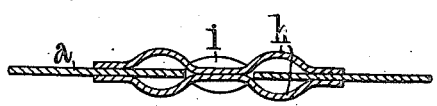
Fig. 5 is a fragmental section of a portion of the inner covering disk shown in Fig. 2.

The inner disk $a$ is split across radially at the center of the larger part of the aperture, as shown by the dotted lines in Fig. 2, and the tail-piece $h$ is made of two adjacent thicknesses of plate, as shown in Fig. 5. in order that it may form a clip for holding together the two edges of the disk at the radial cut.

The two adjacent portions of the tail-piece $h$ are united by rivets $i$, the cut in the disk $a$ being made sufficiently wide to accommodate these rivets so that the united members $g$ and $h$ will slide in a radial direction to allow of placing the disk over the end of the hub, and subsequently closing the open portion of the enlarged part $e$ of the orifice $c$.

The inner disk $a$ may be provided with a plurality of holes $j$ which accommodate eye-bolts $k$ threaded upon the spokes $l$ of the wheel. These eye-bolts are provided with nuts or nipples $m$ which are screwed upon the bolts after the disk $a$ is in position. Washers or stiffening rings such as $n$ may, if desired, be used to provide a stiffer seating for the nipples $m$. Stiffening pieces or rings may also be provided at other portions, such as around the rim of the disk, if desired.

The disk $b$ upon the outer side of the wheel may be formed with a central cap $o$ of increased thickness, which is riveted or otherwise attached to the disk as shown in Fig. 1. The cap $o$ has a central hole with a conical depression through which a screw $p$ having a correspondingly coned head passes to engage a tapped hole in the grease cap $q$ of the hub $d$, the outer edge of the disk resting upon the rim of the wheel.

Both of the disks $a$ and $b$ are of such a configuration that for example in the case of the outer disk $b$ the edge thereof comes in contact with the rim of the wheel before the screw $p$ is fully home. By this means tightening the screw $p$ forces the disk firmly against the rim of the wheel and thus provides a tight joint for the exclusion of dust and wet. The inner disk $a$ also has its outer edge pulled tightly against the rim of the wheel by means of the eye-bolts $k$, the diameters of both disks being substantially equal to the extreme diameter of the wheel rim.

Figure 3:
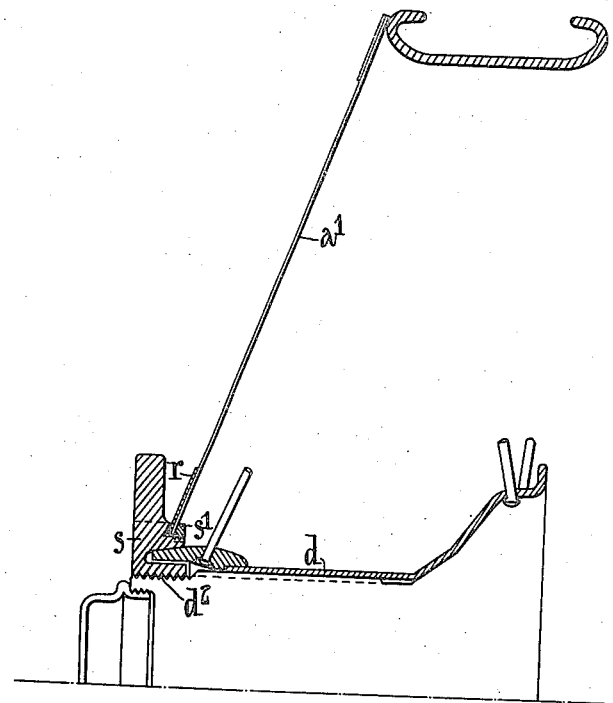
Fig. 3 shows another method of attaching the outer disk.

In the arrangement shown in Fig. 3, the inner disk is of similar construction to that already described. The outer disk $a'$ is, however, provided with a central stiffening ring $r$ in place of a cap such as $o$. This ring is engaged by a lock nut $s$ retaining the outer hub part $d'$ upon the inner hub part $d^2$. The disk $a'$ is retained permanently in connection with the lock nut $s$ by means of a threaded ring $s'$ screwed upon the inner part of the lock nut, and as the lock nut $s$ is completely removed from the wheel when detaching the outer hub part $d'$ from the inner hub part $d^2$, the disk $a'$ is also removed at the same time and forms no obstacle to any operation connected with the rapid withdrawal or replacement of the detachable part of the wheel. This type is particularly applicable to racing cars, where the saving of time in replacing wheels or executing repairs is of the utmost importance.

Figure 4:
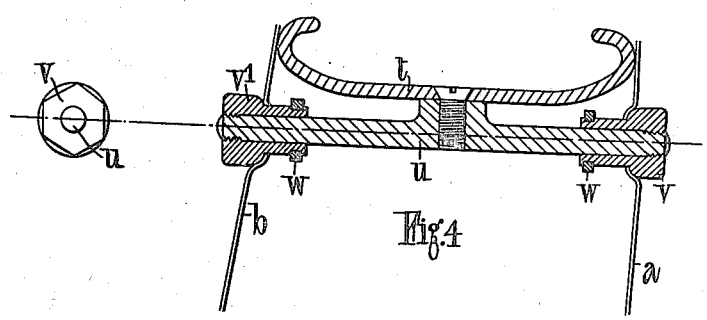
Fig. 4 shows a method of attachment by which the disks may be removed from the wheel without disconnecting the attachment devices from their respective parts.
Figure 6:
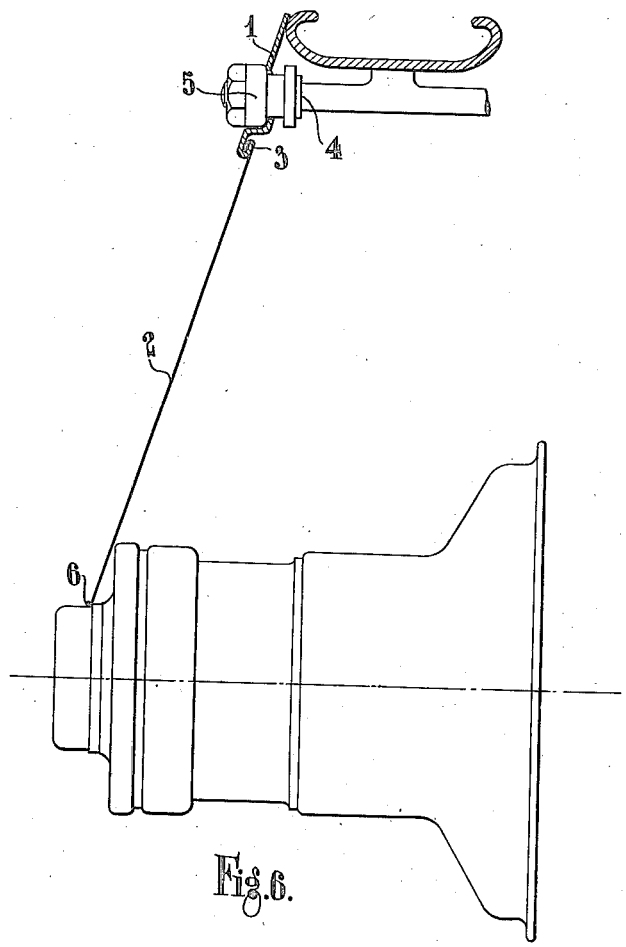
Fig. 6 is a fragmental section of a construction in which flexible disks are used.

In the arrangement shown in Fig. 4, both disks $a$ and $b$ are attached to the wheel by means of a plurality of attachment devices arranged around the circumference, these being preferably equidistant so that the disks may be readily attached in any position. To the rim $t$ of the wheel are attached double-ended cross bolts $u$ which are engaged by nuts $v$ $v'$, carried respectively by the inner and outer disks. The nuts $v$ and $v'$ are provided with a portion of reduced diameter having a groove into which may be inserted a spring ring $w$. The reduced portions of the nuts pass through suitable holes in the disks and are retained therein by the rings $w$ when placed in position in the grooves. By this means the nuts are always retained in connection with the disks while at the same time they are capable of rotational and axial movement to effect engagement with the bolts $u$, and the loss of the nuts when removing a disk is by this means completely obviated.

Where it is desired to use very light and flexible material such as oiled silk or the like for the disks as shown in Fig. 6, a rigid ring 1 of metal or other material may be employed of nearly as great an external diameter as the over-all diameter of the rim, and of greater depth than the rim, the disk of flexible material 2 being attached to this flat ring by engaging a turned-over edge as at 3. The ring 1 is then pressed against the sides of the wheel rim by a plurality of bolts and nuts 4, 5 in the manner already described. The center opening 6 of the flexible disk where the wheel is coned, as on the outside of the wheel can be finished off with a perfectly flexible ring which will be held in contact with the hub by the tension of the material of the flexible disk. If preferred, however, such flexible disks may be provided with a stiff inner ring.

The before-described constructions form only some methods of carrying this invention into effect, and it will be readily seen that others may be adopted without in any way departing from the spirit of the invention.

Having now described our invention what we claim as new and desire to secure by Letters Patent is:—

1. In combination in a spoked wheel, a covering shield upon the inner side thereof held by a plurality of fastening devices and extending between the hub and rim and a second shield covering the spokes upon the outer side thereof and held by a single fastening device.

2. In combination in a spoked wheel, a covering shield upon the inner side thereof extending between the hub and rim, a plurality of devices fastening said shield to said wheel, a second shield covering the spokes upon the outer side of said wheel and a device fastening said second shield to the hub of the wheel.

3. In combination in a spoked wheel, a covering shield upon the inner side thereof extending between the hub and rim, a plurality of devices at points radially distant from the hub to hold said shield in position, a second shield covering the spokes upon the outer side of said wheel and means independent of said first-mentioned means pressing the circumference of said second shield against the other edge of the rim.

4. In combination in a spoked wheel, a covering shield upon the inner side thereof extending between the hub and rim, means engaging radially distributed portions of the wheel to hold said shield in position, a second shield covering the spokes upon the outer side of said wheel and means independent of said first-mentioned means and adjacent the axis of the wheel for pressing the circumference of said second shield against the other edge of the rim.

5. In combination in a spoked wheel, a covering shield upon the inner side thereof extending between the hub and rim, means engaging radially distributed portions of the wheel to hold said shield in position, a second shield covering the spokes upon the outer side of said wheel and a screw threaded device coacting with the hub at the center of said second shield to press the circumference thereof against the other edge of the rim.

6. In combination in a spoked wheel, a covering shield upon the inner side thereof extending between the hub and rim, means pressing the circumference of said shield against the edge of the rim, a second shield covering the spokes upon the outer side of said wheel and a screw passing through the center of said second shield to engage a hole in the hub for pressing the circumference of said second shield against the other edge of the rim.

7. In combination in a spoked wheel, a covering shield upon the inner side thereof extending between the hub and rim, means distributed around said shield to press the circumference thereof against the edge of said rim, a second shield covering the spokes upon the outer side of said wheel and means independent of said first-mentioned means pressing the circumference of said second shield against the other edge of the rim.

8. In combination in a spoked wheel, a covering shield upon the inner side thereof extending between the hub and rim, means distributed around said shield to press the circumference thereof against the edge of said rim, a second shield covering the spokes upon the outer side of said wheel and a screw threaded device coacting with the hub at the center of said second shield to press the circumference thereof against the other edge of the rim.

9. In combination in a spoked wheel, a covering shield upon the inner side thereof extending between the hub and rim, eye bolts swiveled upon the spokes and distributed around said shield to press the circumference thereof against the edge of said rim, a second shield covering the spokes upon the outer side of said wheel and means independent of said eye bolts for pressing the circumference of said second shield against the outer edge of the rim.

10. In combination in a spoked wheel, a covering shield upon the inner side thereof extending between the hub and rim, eye bolts swiveled upon the spokes and distributed around said shield to press the circumference thereof against the edge of said rim, a second shield covering the spokes upon the outer side of said wheel and a screw threaded device coacting with the hub at the center of said second shield to press the circumference thereof against the other edge of the rim.

11. In combination in a spoked wheel, an annular disk in which the aperture forms two adjacent semicircles of different diameters and a radial slit passes from the larger half of said aperture to the circumference, a movable slide covering said slit and clipping the disk upon each side thereof, a U-shaped extension to said slide covering the excess portion of the greater semicircle to form a central circular aperture to said disk, means retaining said disk upon the inner side of the wheel so that the circumference is in connection with the rim, a flanged inner end to the hub of said wheel projecting through said aperture and a second disk covering the spokes on the outer side of said wheel.

12. In combination in a spoked wheel, an annular disk in which the aperture forms two adjacent semicircles of different diameters, and a radial slit passes from the larger half of said aperture to the circumference, a movable slide covering said slit and clipping the disk upon each side thereof, a U-shaped extension to said slide covering the excess portion of the greater semicircle to form a central circular aperture to said disk, eye bolts swiveled upon the spokes and retaining said disk upon the inner side of the wheel so that the circumference is in connection with the rim, a flanged inner end to the hub of said wheel projecting through said aperture, a second disk covering the spokes upon the outer side of said wheel and a screw threaded device coacting with the hub at the center of said second disk to press the circumference thereof against the other edge of the rim.

In testimony whereof, we affix our signatures in presence of two witnesses.

JOHN V. PUGH.
WILLIAM BLAIR.

Witnesses:
E. COOKE,
W. A. BRATCH.